(12) United States Patent
Horie et al.

(10) Patent No.: US 6,351,584 B1
(45) Date of Patent: Feb. 26, 2002

(54) OPTICAL TRANSMITTER-RECEIVER AND OPTICALLY SENDING/RECEIVING METHOD

(75) Inventors: Kazuyoshi Horie, Saitama; Yoichi Toriumi, Tokyo; Hideki Yoshida; Kenichi Ookubo, both of Kanagawa; Kuninori Shino, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/205,982

(22) Filed: Dec. 4, 1998

(30) Foreign Application Priority Data

Dec. 16, 1997 (JP) .............................................. 9-346845

(51) Int. Cl.[7] .................................................. G02B 6/26
(52) U.S. Cl. ....................................................... 385/31
(58) Field of Search ............................... 385/31, 24, 12, 385/33, 88–94, 49, 35, 38, 48; 359/152, 154, 159, 163, 110; 356/73.1

(56) References Cited

U.S. PATENT DOCUMENTS 4,212,537 A * 7/1980 Golob et al.
6,040,934 A * 3/2000 Ogusu et al.

* cited by examiner

Primary Examiner—Richard A. Rosenberger
Assistant Examiner—Tu T. Nguyen
(74) Attorney, Agent, or Firm—Sonnenschein, Nath & Rosenthal

(57) ABSTRACT

An optical transmitter-receiver according to the present invention is an optical transmitter-receiver connected to an optical fiber used for a single-core two-way optical communication channel for making a first optical signal S1 to be sent incident upon the end of the optical fiber and receiving a second optical signal S2 sent via the optical fiber. The above optical transmitter-receiver is provided with emission means for emitting a first optical signal S1, an optical system for making a first optical signal S1 from the emission means incident upon the incident end of the optical fiber in a direction R1 different from a direction in which a second optical signal S2 is outgoing from the end of the optical fiber and light receiving means for receiving a second optical signal S2 outgoing from the end of the optical fiber.

8 Claims, 18 Drawing Sheets

FIG. 7

| OPTICAL FIBER OUTSIDE DIAMETER | 1,000 μm |
|---|---|
| COATING OUTSIDE DIAMETER | 2.2 mm |
| COATING MATERIAL | POLYETHYLENE |
| TRANSMISSION LOSS | 14 dB / 100 m* |
| BAND | 160 MHz @ 100 m* |

(*: REFERENCE VALUE WITH MONOCHROMATIC PARALLEL BEAMS WITH WAVELENGTH OF 650 nm)

F I G. 10
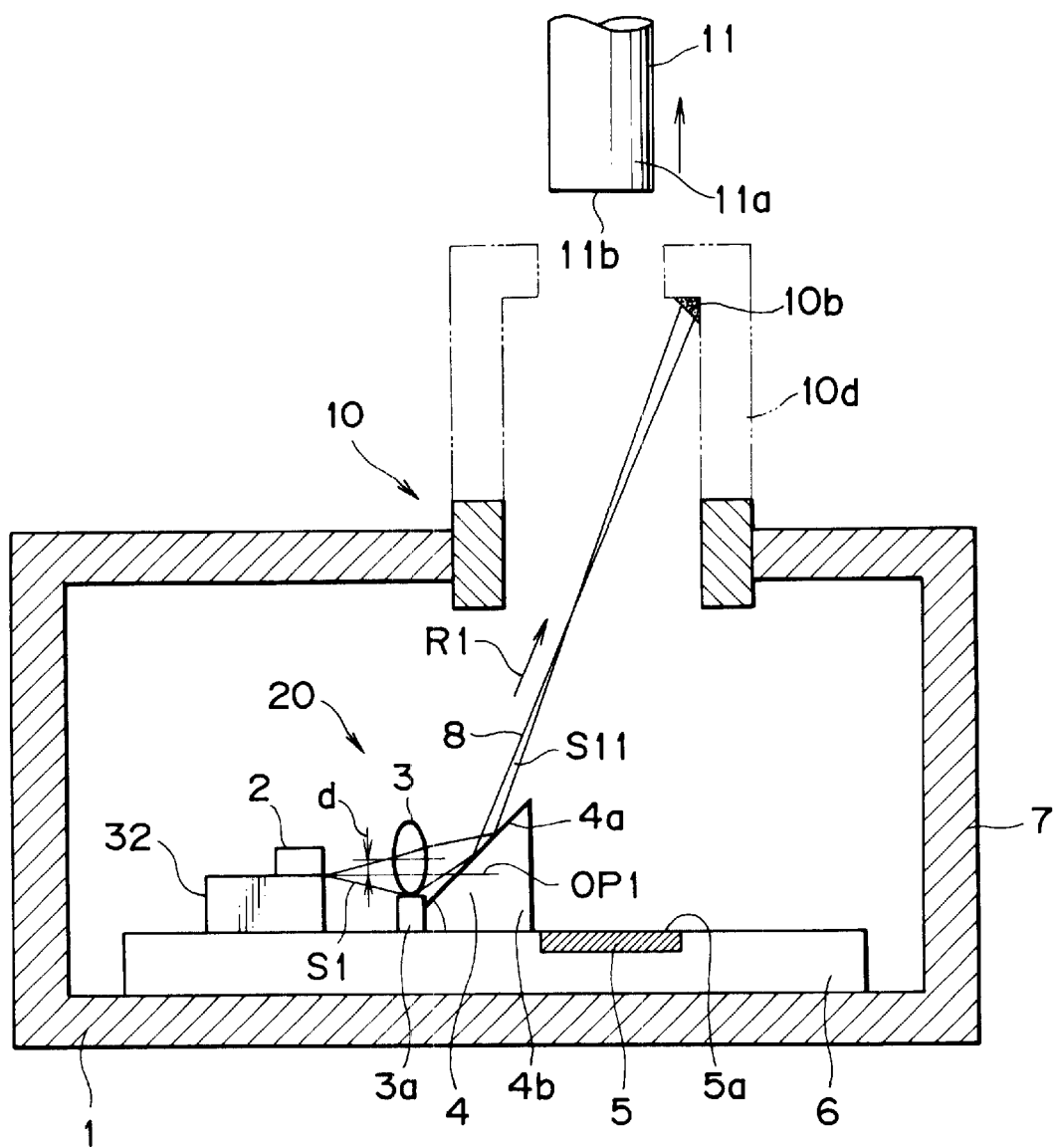

F I G. 12
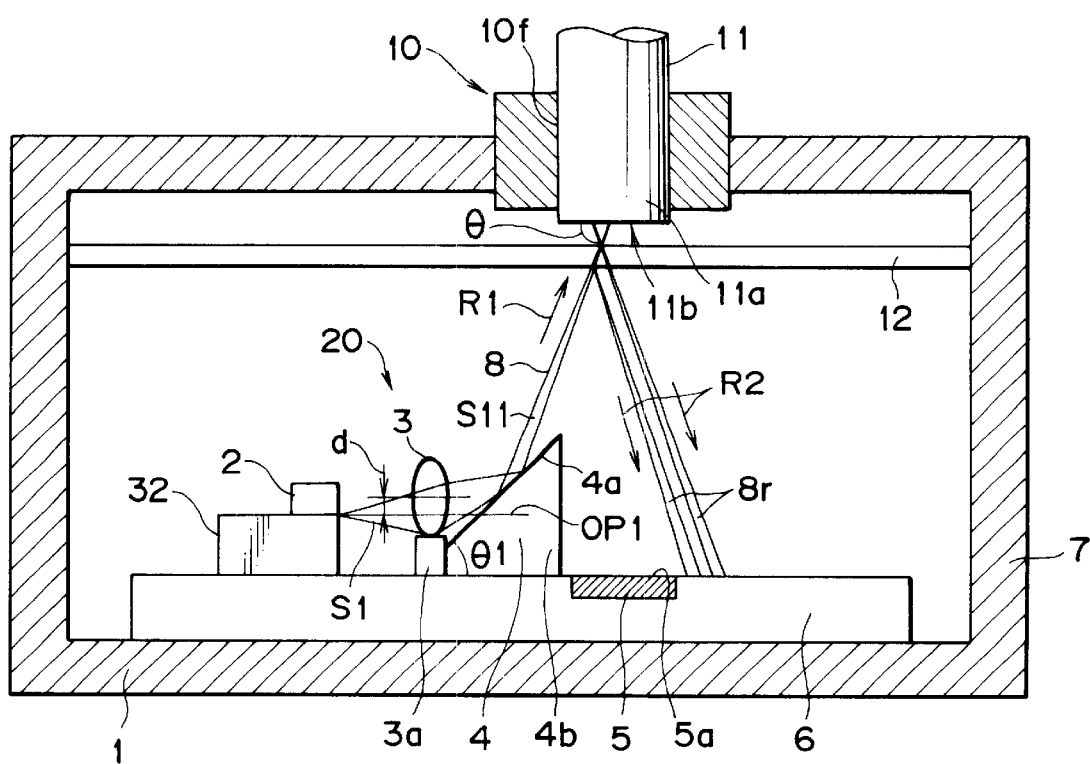

F I G. 15
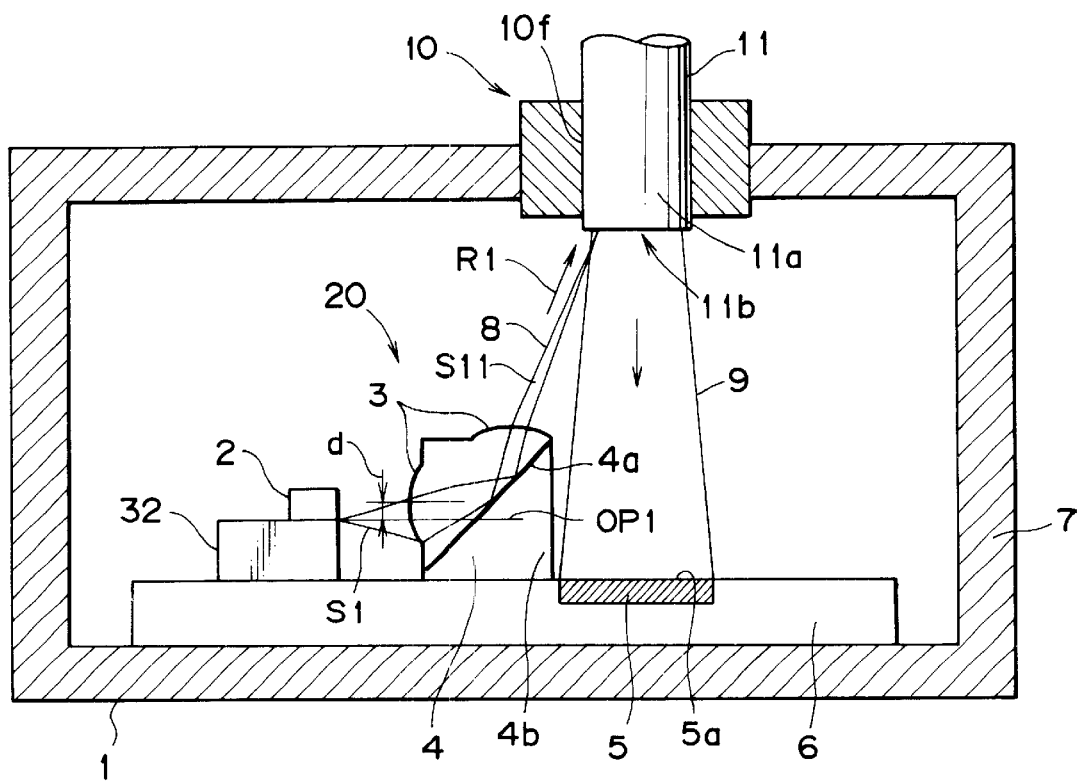

OPTICAL TRANSMITTER-RECEIVER AND OPTICALLY SENDING/RECEIVING METHOD

BACKGROUND OF THE INVENTION

1. Field of the Invention

The present invention relates to an optical transmitter-receiver for single-core two-way optical communication and an optically sending/receiving method.

2. Description of the Related Art

The need for a system for transmitting a signal by optical communication more and more has increased as information communication is varied. If a signal is transmitted by optical communication, a single-core two-way telecommunication line system using one optical fiber and a two-core two-way telecommunication line system using two optical fibers are normally used.

For the single-core two-way optical communication system, an optical transmitter-receiver shown in FIG. 1 is used.

The conventional type optical transmitter-receiver shown in FIG. 1 is required to split an optical path for sending and an optical path for receiving so as to realize single-core two-way optical communication. The optical path for sending means an optical path in which beams outgoing from a laser beam generating source 1002 are reflected by the reflecting surface 1004a of a beam splitter 1004 and are incident upon the end 1011a of an optical fiber 1011 through a focusing lens 1003.

The optical path for receiving means an optical path in which outgoing beams from the optical fiber 1011 are focused with the focusing lens 1003 and are incident on a photodiode 1005 through the reflecting surface 1004a of the beam splitter 1004. That is, the beam splitter 1004 is used for splitting the optical path for sending and the optical path for receiving.

As described above, in sending, beams from the laser beam generating source 1002 are reflected by the reflecting surface 1004a of the beam splitter 1004. However, in case beams are reflected, beams equivalent to some percent of the above beams are directly incident upon the beam splitter 1004 through the reflecting surface 1004a as stray light 1008a. Stray light 1008a incident upon the beam splitter 1004 as described above is also incident upon the photodiode 1005. That is, the photodiode 1005 receives not only light for receiving normally outgoing from the optical fiber 1011 but stray light 1008a as crosstalk. When stray light 1008a is incident upon the photodiode 1005, the signal-to-noise ratio (S/N) of the photodiode 1005 is deteriorated and the transmission distance of the optical fiber 1011 is reduced.

There is also an example of another conventional type that a polarizing beam splitter in accordance with the oscillation and the polarization of the laser beam generating source 1002 is used in place of the beam splitter 1004, however, as a laser beam is also not complete linear polarized light in this case, stray light 1008a cannot be completely prevented from being generated in sending.

As outgoing beams from the optical fiber 1011 are also reflected by the reflecting surface (the mirror finished surface) 1004a of the beam splitter 1004 when the photodiode 1005 receives the above outgoing beams, beams equivalent to some percent of beams for receiving do not reach the photodiode 1005 and are wasted. Received beams reflected by the reflecting surface 1004a of the beam splitter 1004 are incident upon the laser beam generating source 1002 and may instabilize characteristics for oscillating the laser beam generating source 1002.

The present invention is made to solve the above problems and the object is to provide an optical transmitter-receiver and an optically sending/receiving method wherein crosstalk can be prevented from being generated in the case of optical sending/receiving using a single-core two-way optical communication interface circuit and optically sending/receiving efficiency can be enhanced.

SUMMARY OF THE INVENTION

The above object of the present invention is achieved by an optical transmitter-receiver based upon an optical transmitter-receiver connected to an optical fiber used for a single-core two-way optical communication channel for sending a first optical signal to be sent to the end of the optical fiber and for receiving a second optical signal sent via the optical fiber and characterized by being provided with beams generating means for emitting a first optical signal, light receiving means for receiving a second optical signal outgoing from the end of the optical fiber and an optical system for making a first optical signal from the beams generating means incident upon the incident end of the optical fiber in a direction different from a direction in which a second optical signal is outgoing from the end of the optical fiber.

The present invention relates to the optical transmitter-receiver connected to an optical fiber used for a single-core two-way optical communication channel for making a first optical signal to be sent incident upon the end of the optical fiber and receiving a second optical signal sent via the optical fiber. The beams generating means of the optical transmitter-receiver emits a first optical signal. The light receiving means receives a second optical signal outgoing from the end of the optical fiber. The optical system makes a first optical signal from the beams generating means incident upon the incident end of the optical fiber in a direction different from a direction in which a second optical signal is outgoing from the end of the optical fiber.

Hereby, as the optical system makes a first optical signal from the beams generating means incident upon the end of the optical fiber in a direction different from a direction in which a second optical signal is outgoing from the end of the optical fiber, the optical path of a first optical signal and the optical path of a second optical signal can be approximately completely made independent. Hereby, as a part of a first optical signal is never received together with a second optical signal by the light receiving means, optical crosstalk (stray light) can be removed from the light receiving means.

In the present invention, after a focusing member focuses a first optical means from the beams generating means, a direction converting element converts the optical path of the focused first optical signal to a direction different from a direction in which a second optical signal is outgoing from the end of the optical fiber and can make the first signal incident upon the end of the optical fiber desirably by providing the focusing member and the direction converting element to the optical system. Hereby, the first optical signal from the beams generating means can be made efficiently incident upon the end of he optical fiber.

In the present invention, desirably if the direction converting element of the optical system is provided with a reflecting film with simple structure for converting the optical path of a first optical signal to a direction different from a direction in which a second optical signal is outgoing from the end of the optical fiber, a first optical signal can be made securely and efficiently incident upon the end of the optical fiber.

In the present invention, desirably if the reflecting film is a total reflection film, a first optical signal can be made incident upon the end of the optical fiber without the loss of the luminous energy of the first optical signal.

In the present invention, if a package for housing the beams generating means, the optical system and the light receiving means is provided and is attached to the end of the optical fiber with the end of the optical fiber directed to the light receiving means so that the package can be detached, the optical fiber can be readily attached/detached to/from the optical transmitter-receiver.

In the present invention, desirably if light shielding means is arranged in the package to prevent beams from the beams generating means from leaking out of the package, beams from the beams generating means can be prevented from leaking out of the package even if the optical fiber comes off the package.

In the present invention, desirably if the light receiving means is arranged outside an area which reflected light generated because a first optical signal is reflected by the end of the optical fiber reaches when the first optical signal is incident upon the end of the optical fiber, crosstalk (stray light) can be more securely prevented from being generated.

In the present invention, desirably if a focusing element is provided to focus a second optical signal and make it incident upon the light receiving means, efficiency for making a second optical signal incident upon the light receiving means can be enhanced.

The above object of the present invention is achieved by an optically sending/receiving method based upon an optically sending/receiving method for making a first optical signal to be sent incident upon the end of the optical fiber and receiving a second optical signal sent via the optical fiber and characterized in that a first optical signal from the beams generating means is made incident upon the end of the optical fiber in a direction different from a direction in which a second optical signal is outgoing from the end of the optical fiber and in addition, the light receiving means receives a second optical signal outgoing from the end of the optical fiber.

Hereby, as a first optical signal from the beams generating means is incident upon the end of the optical fiber in a direction different from a direction in which a second optical signal is outgoing from the end of the optical fiber, the optical path of a first optical signal and the optical path of a second optical signal can be approximately completely made independent. As a result, as a part of a first optical signal is never received together with a second optical signal by the light receiving means, optical crosstalk (stray light) can be removed from the light receiving means.

BRIEF DESCRIPTION OF THE DRAWINGS

FIG. 7 shows an example of the characteristics of the optical fiber;

FIG. 10 shows further another embodiment of the optical transmitter-receiver according to the present invention;

FIG. 12 shows furthermore another embodiment of the optical transmitter-receiver according to the present invention;

FIG. 15 shows furthermore another embodiment of the optical transmitter-receiver according to the present invention;

DESCRIPTION OF THE PREFERRED EMBODIMENTS

Referring to the attached drawings, preferred embodiments of the present invention will be described in detail below.

As the following embodiments are suitable concrete examples of the present invention, technically suitable various limitations are set, however, the scope of the present invention is not limited to these embodiments unless the present invention is limited in the following description.

Figure 1:
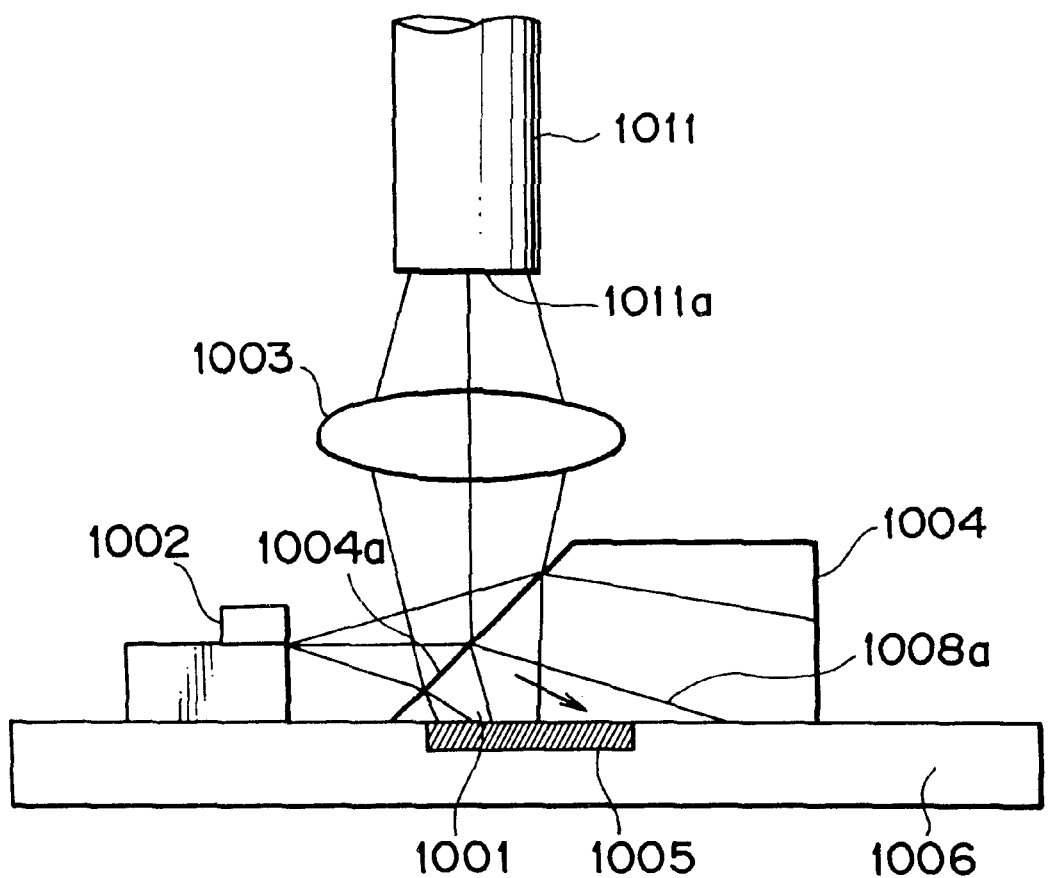
FIG. 1 shows a conventional type optical transmitter-receiver.
Figure 2:
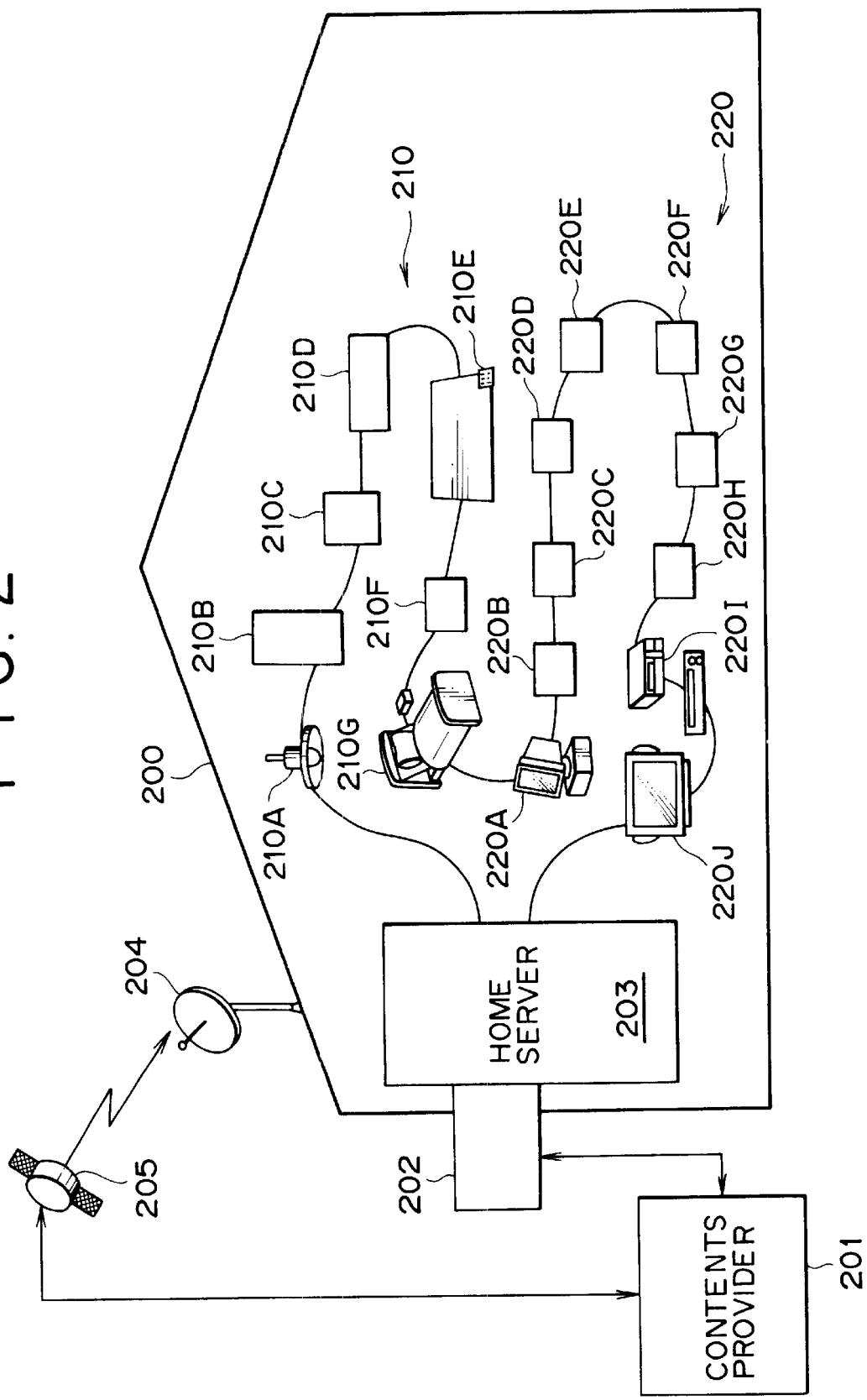
FIG. 2 shows an example in which an optical transmitter-receiver and an optically sending/receiving method respectively according to the present invention are used for a control system and multimedia information communication in home as an example in which the above optical transmitter-receiver and optically sending/receiving method can be applied.

FIG. 2 shows an example in which a home called a connected home is connected to information providers in the world via a network as an object to which an optical transmitter-receiver according to the present invention can be applied.

In the home 200, various electronic equipment, information equipment and others are arranged. The home 200 is constituted so that information can be provided from an external contents provider 201 to a home server 203 via an access network 202 and information can be sent from the home server 203 to the contents provider 201 via the access network 202. An antenna 204 is provided to the home 200 so that information from the contents provider 201 can be received via an artificial satellite 205. For a method of providing information, a method using a ground wave may be also adopted.

The control system 210 of the above equipment and a multimedia system 220 are provided to the home 200 shown in FIG. 2. The control system 210 forms a signal path for controlling equipment used in a general home such as an electric lamp 210A, a refrigerator 210B, an electronic oven 210C, the body interior equipment 210D of an air conditioner, a heating carpet 210E, a hot-water supply system by gas 210F and equipment for at-home medical care 210G.

In the meantime, the multimedia system 220 forms a signal path for controlling equipment corresponding to a multimedia era such as a computer 220A, a telephone set 220B, audio equipment 220C, portable information equipment 220D, a digital still camera 220E, a printer facsimile 220F, a digital video camera 220G, a game machine 220H, a digital versatile disc or a digital video disc (DVD) player 220I and a television set 220J.

The above various equipment in the control system 210 and the multimedia system 220 is constituted so that the various equipment can control the on or off of each equipment in the control system 210, can provide information to various equipment, can switch on or off the television set 220J in the multimedia system 220, can be operated to supply or send information by sending or receiving an optical signal to/from the home server 203 using an optical fiber described later according to a single-core two-way optical communication method.

Figure 3:
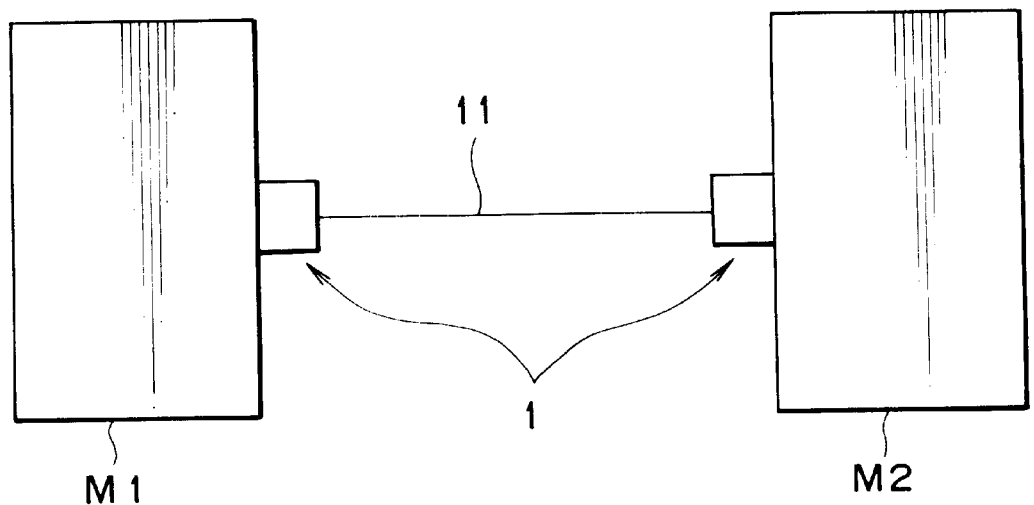
FIG. 3 briefly shows an example in which the optical transmitter-receiver according to the present invention is arranged between equipment.

FIG. 3 shows an example of an optical transmitter-receiver 1 for connecting each equipment in the control system 210 or in the multimedia system 220 respectively shown in FIG. 2 and connecting each equipment and the home server 203. The optical transmitter-receiver is used for a so-called single-core two-way optical communication interface circuit and an optical fiber 11 can transmit an optical signal between one equipment M1 and the other equipment M2. The optical transmitter-receiver 1 is respectively provided to such equipment M1 and M2. The above equipment M1 and M2 mean each equipment in the control system 210 and in the multimedia system 220, the home server 203 respectively shown in FIG. 2 and others.

Figure 4:
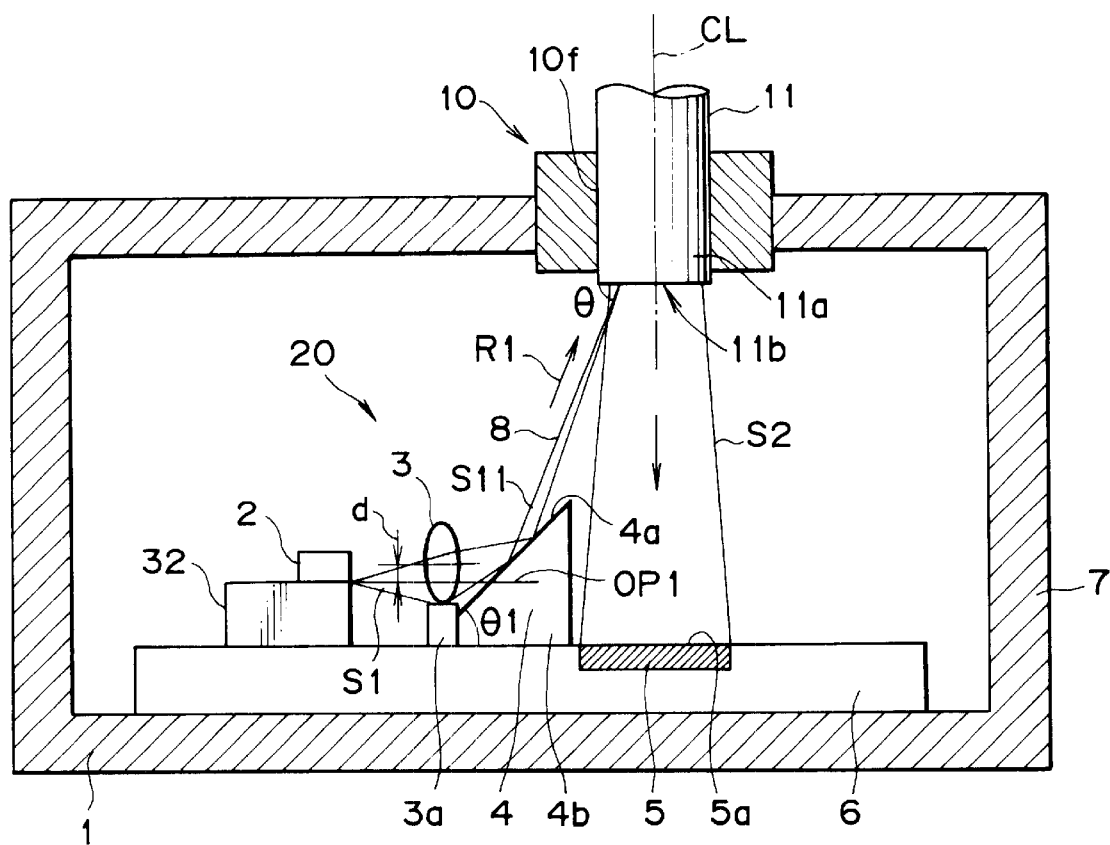
FIG. 4 is a sectional view showing a desirable embodiment of the optical transmitter-receiver according to the present invention.
Figure 5:
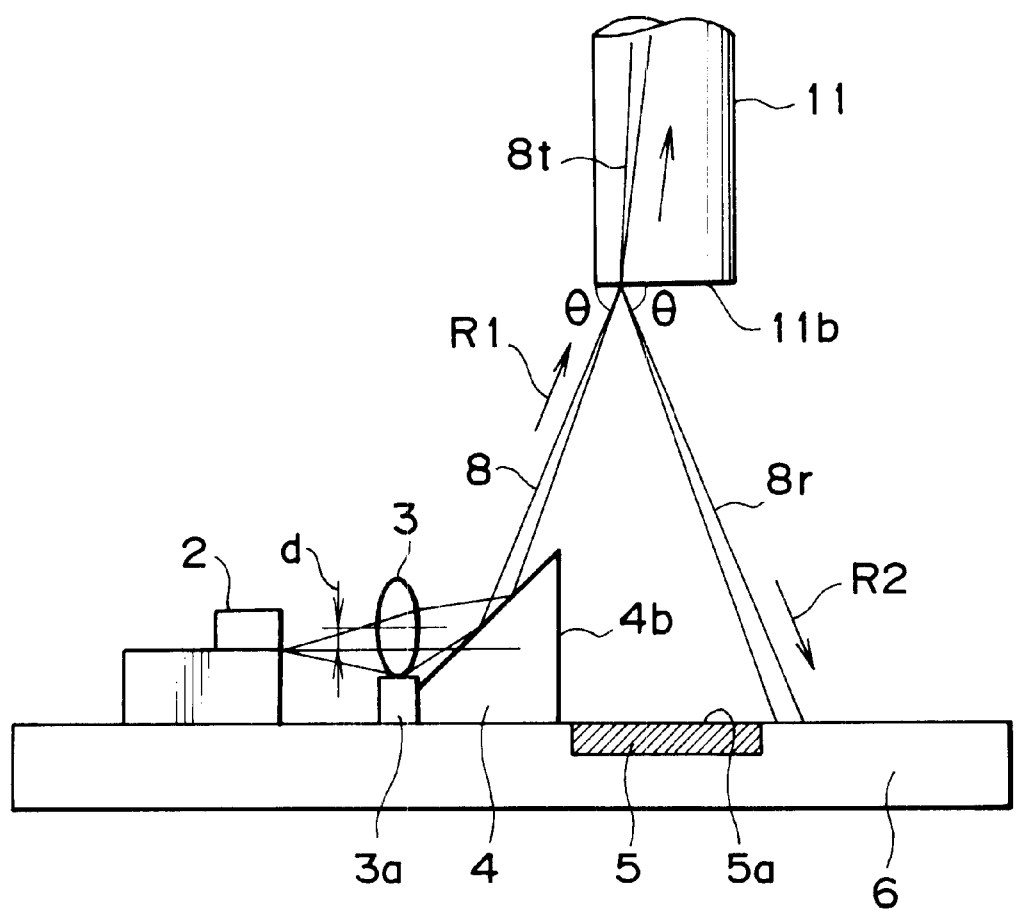
FIG. 5 shows an appearance in which light reflected by the end of an optical fiber reaches an area except the light receiving area of a photodiode in the embodiment shown in FIG. 4.

FIGS. 4 and 5 show a preferred embodiment of the optical transmitter-receiver 1 shown in FIG. 3. The optical transmitter-receiver 1 executes single-core two-way optical communication using the optical fiber 11.

The end 11a of the optical fiber 11 can be fitted into the hole 10f of a connector 10 for a package 7 of the optical transmitter-receiver 1 so that the optical fiber can be detached. The optical transmitter-receiver 1 is provided with the package 7, a laser beam generating source 2 as laser beam generating means, an optical system 20, a photodiode 5 as light receiving means and others.

The laser beam generating source 2 is provided on a semiconductor device 32. The laser beam generating source 2 is a semiconductor laser for emitting a laser beam L with the wavelength of 650 nm for example and a laser beam L means a first optical signal S1 to be sent. The laser beam generating source 2 is driven by a laser beam generating source driving circuit not shown and the laser beam generating source driving circuit drives the laser beam generating source 2 so that a first optical signal S1 is generated.

The optical system 20 is arranged in an optical path between the laser beam generating source 2 and the optical fiber 11. It is desirable that the axial direction CL of the optical fiber 11 is perpendicular to the optical axis OP1 of a first optical signal S1. The optical system 20 is provided with a function for bending the optical path of a first optical signal S1 in a direction shown by an arrow R1 and making the first optical signal S1 incident upon the end 11a of the optical fiber 11.

The optical system 20 is provided with a focusing lens 3, its stand 3a and a reflecting mirror 4. The stand 3a is used for fixing the focusing lens 3 and the focusing lens 3 is opposite to the laser beam generating source 2. The reflecting mirror 4 is located on the rear side of the focusing lens 3, the section is approximately triangular and it is desirable that a total reflection film 4a is formed on the inclined surface.

The focusing lens 3 is a convex lens for leading a first optical signal S1 from the laser beam generating source 2 on the side of the total reflection film 4a of the reflecting mirror 4, and the center of the focusing lens 3 and the center of the intensity of a first optical signal S1 are off by distance d. Therefore, a first optical signal S1 through the focusing lens 3 is focused by the focusing lens 3 and the vector of the center of the intensity is bent. A laser beam signal S1 the vector of which is bent and focused is reflected by the total reflection film 4a of the reflecting mirror 4 and is obliquely incident upon the end face 11b of the end 11a of the optical fiber 11 at an angle θ (θ is smaller than 90°) as a ray 8.

The laser beam generating source 2, the semiconductor 32, the stand 3a the optical system 20, the reflecting mirror 4 respectively described above and the photodiode 5 described next which is light receiving means are set on a semiconductor substrate 6.

In the meantime, a second optical signal S2 outgoing from the end face 11b of the optical fiber 11 shown in FIG. 4 is directly incident upon the photodiode 5. That is, the photodiode 5 is embedded and fixed in the semiconductor substrate 6 in a position corresponding to the end face 11b of the optical fiber 11.

Next, referring to FIGS. 4, 5 and 6, the operation for sending or receiving a first optical signal S1 and a second optical signal S2 of the optical transmitter-receiver 1 will be described.

A first optical signal S1 generated by the laser beam generating source 2 is focused by the focusing lens 3. As the center of the intensity of a first optical signal S1 is off from the center of the focusing lens 3 by distance d at this time, the vector of the center (the principal ray) of the intensity of the first optical signal S1 which is an outgoing beam is bent upward in the drawing because the first optical signal is reflected by the total reflection film 4a of the mirror 4 and is directed in the direction shown by the arrow R1 as the ray 8.

Figure 6:
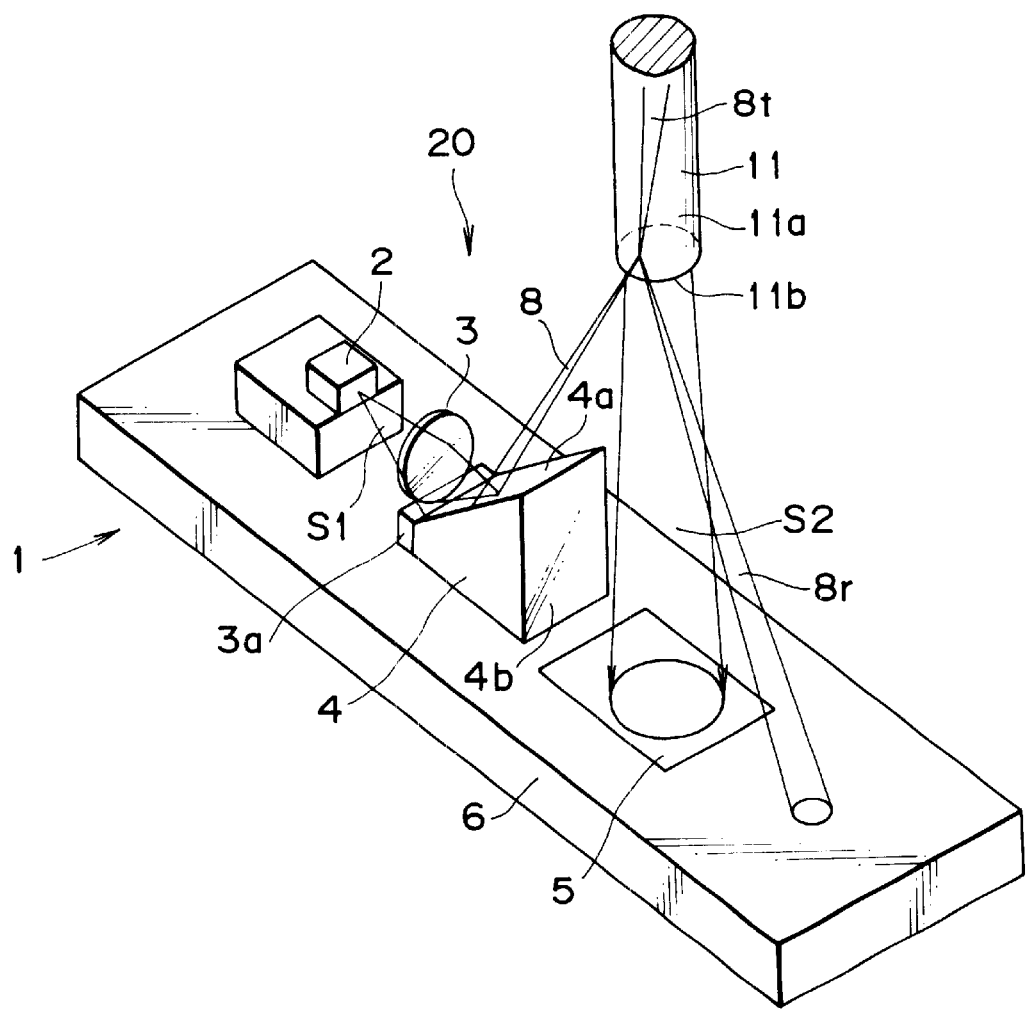
FIG. 6 is a perspective drawing showing the embodiment of the optical transmitter-receiver shown in FIG. 5.

As shown in FIGS. 5 and 6, the beam of the first optical signal S1 is incident upon the end face 11b of the optical fiber 11 at the angle θ. The incident beam 8 is split into a ray 8t transmitted inside the optical fiber 11 and a ray 8r reflected by the end face 11b of the optical fiber 11. As optical crosstalk (stray light) is caused in the photodiode 5 when the reflected ray 8r reaches the light receiving area of the photodiode 5, the ray 8r is reflected in a direction shown by an arrow R2. The ray 8r is reflected by the end face 11b at the angle θ in the direction shown by the arrow R2 toward the semiconductor substrate 6. An area which the ray 8r reaches after it is reflected on the semiconductor substrate 6 is outside the light receiving area of the photodiode 5. That is, the ray 8r can be prevented from entering the light receiving range of the photodiode 5 by selecting the angle of the ray 8r advanced obliquely with the position of the photodiode 5 to avoid stray light. Such effect can be also realized by selecting an angle with the end face 11b of the optical fiber 11 and further the degree (the effective numerical aperture) of the convergence of the ray 8r.

A situation that a first optical signal S1 generated by the laser beam generating source 2 is returned to the side of the laser beam generating source 2 is prevented from occurring by selecting the position of the focusing lens 3 for the laser beam generating source 2 as described above and laser oscillating characteristics are never instabilized.

As a reflection preventing film 5a is formed on the surface of the photodiode 5, the luminous energy of a second optical signal S2 can be efficiently converted from light to electricity.

If a total reflection film is formed on the side 4b of the reflecting mirror 4, that is, on the side 4b on the side of the photodiode 5, a second optical signal S2 from the optical fiber 11 is reflected by the total reflection film on the side 4b even if the second optical signal S2 is irradiated on the side 4b of the reflecting mirror 4, can be made incident upon the photodiode 5 and the incident luminous energy of the second optical signal S2 can be prevented from being deteriorated.

A phenomenon that a first optical signal S1 reaches the photodiode 5 through the reflecting mirror 4 can be avoided by setting an angle θ1 of the reflecting mirror 4, that is, the angle θ1 with the semiconductor substrate 6 to approximately 45° and forming the total reflection film 4a on the slant face.

The largest characteristic is that no crosstalk (no stray light) of a second optical signal S2 is caused in the photodiode 5 because the ray 8r of a first optical signal S1 reaches an area outside the light receiving area of the photodiode 5 as shown in FIG. 5 if the second optical signal S2 from the optical fiber 11 is received by the photodiode 5. Therefore, the sending/receiving efficiency of the optical transmitter-receiver can be enhanced.

Even if the total reflection film 4a is not formed on the reflecting mirror 4 but a reflecting film which is not a total reflection film is formed, the crosstalk of a first optical signal S1 and a second optical signal S2 in the photodiode 5 can be mostly prevented.

As described above, the optical path of a first optical signal S1 and the optical path of a second optical signal S2 can be completely split.

As a first optical signal S1 can be made incident upon the end face 11b of the optical fiber 11 at an angle θ only by forming a total reflection film or the other reflecting film on the simple reflecting mirror 4 made of glass or plastic for example, a large-sized beam splitter as in a conventional type is not required to be used and the manufacturing cost can be reduced.

Next, referring to FIGS. 7 and 8, an example of the characteristics of the optical fiber will be described.

FIG. 7 shows an example of the characteristics of the optical fiber 11, the outside diameter of the optical fiber is 1000 μm for example, the outside diameter of its coating is 2.2 mm and the coating is made of polyethylene. The optical fiber is composed of a core and a cladding for covering the core for example and the outside periphery of the cladding is covered with a jacket made of coating material such as the above polyethylene. If a beam from the laser beam generating source is monochromatic parallel light with the wavelength of 650 nm, the transmission loss of the optical fiber 11 is 14 dB/100 m for example and the band is 160 MHz.

Figure 8:
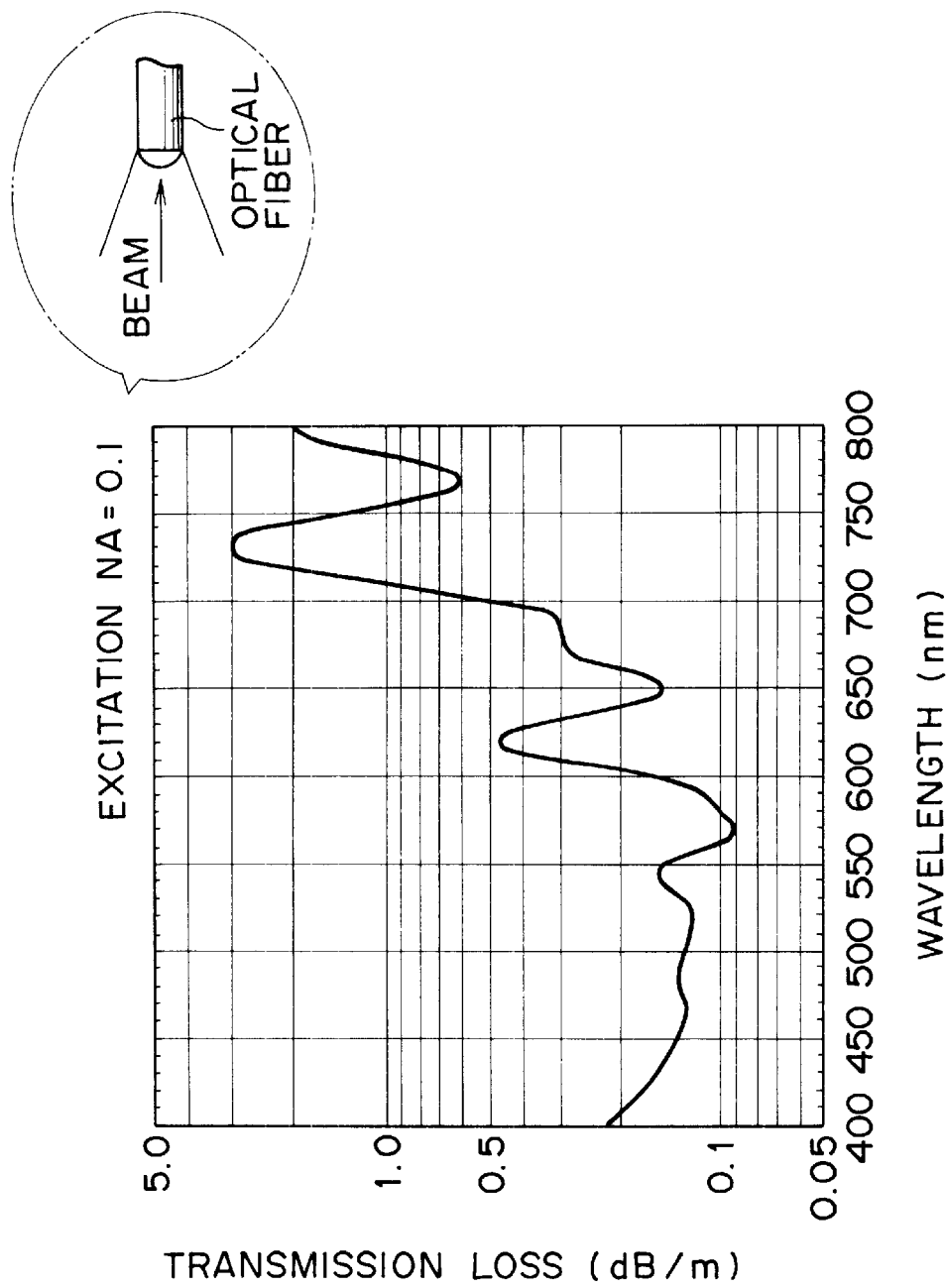
FIG. 8 shows an example of the loss spectrum of the optical fiber.

FIG. 8 shows an example of a spectrum showing the loss of the optical fiber and "excitation NA=0.1" shown in FIG. 8 means that a first optical signal S1 and a second optical signal S2 are incident upon the end face of the optical fiber at the numerical aperture (NA) of 0.1.

In this case, the transmission loss can be reduced up to a relatively small value when the wavelength is 650 nm for example.

Next, referring to FIG. 9, another embodiment of the optical transmitter-receiver according to the present invention will be described. For the following another embodiment of the optical transmitter-receiver according to the present invention, only a part different from the embodiment shown in FIGS. 4 to 6 will be described, the same reference number is allocated to the same part as in the embodiment shown in FIGS. 4 to 6 and the description is omitted.

Figure 9:
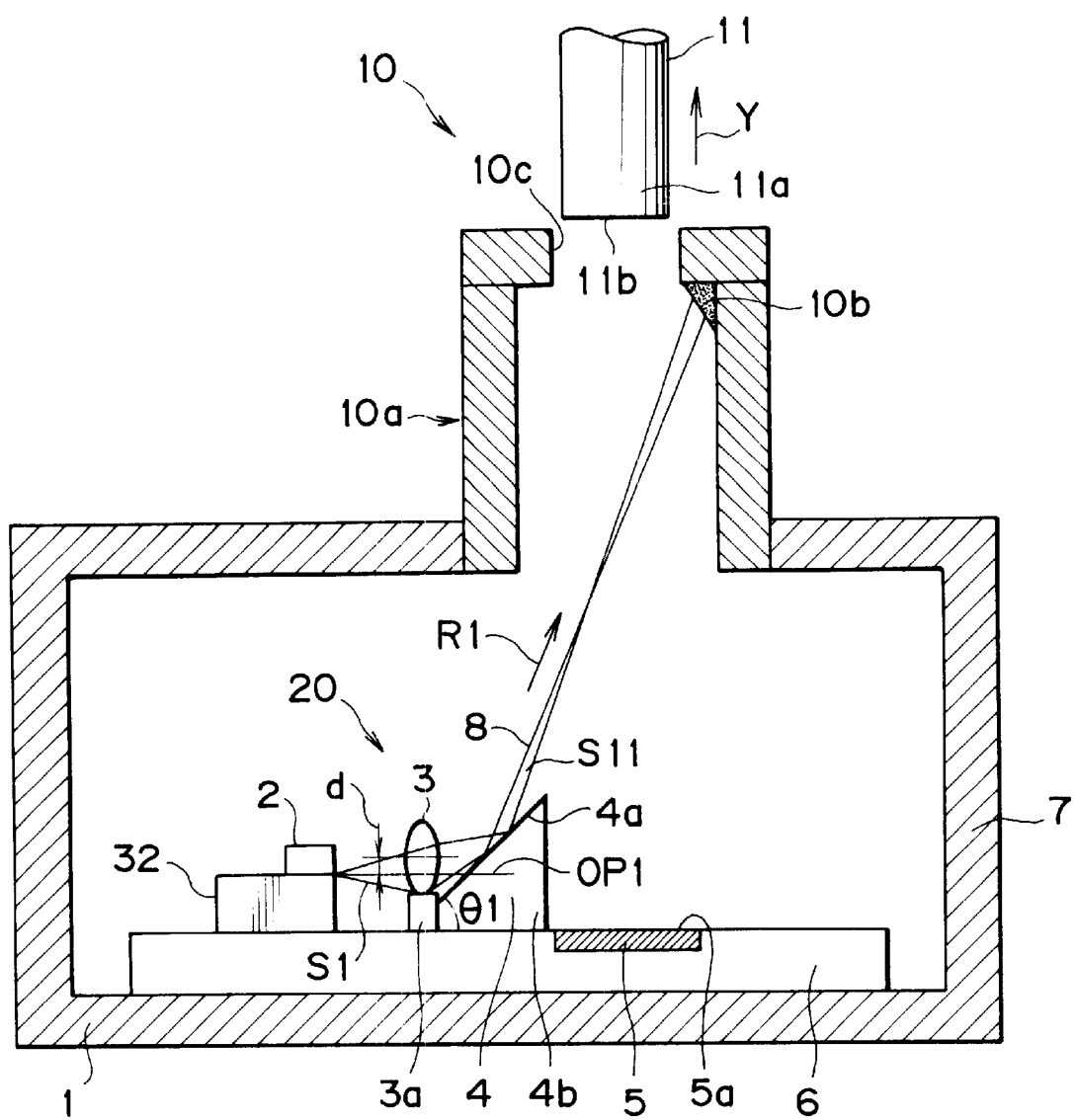
FIG. 9 shows another embodiment of the optical transmitter-receiver according to the present invention.

In an optical transmitter-receiver shown in FIG. 9, a laser beam generating source 2, an optical system 20, a photodiode 5 and others are substantially the same, however, the structure of a connector 10a of an optical fiber 11 is different.

In the embodiment shown in FIG. 4, the connector 10 is provided with the hole 10f for passing the optical fiber 11 and the end face 11b of the optical fiber 11 can be arranged opposite to the photodiode 5 by inserting the optical fiber 11 into the hole 10f.

In the meantime, the connector 10a shown in FIG. 9 is protruded from the upper end of a package 7 in a cylindrical shape for example. A cylindrical hole 10c for example is formed at the upper end of the connector 10a so that the end 11a of the optical fiber 11 can be inserted into the hole 10c.

An optical absorber or absorbent film 10b is provided inside the connector 10a as light shielding means. The optical absorber 10b is provided in a position in which a ray 8 reflected by the total reflection film 4a of a reflecting mirror 4 reaches. That is, the ray 8 is prevented from leaking outside the package 7 by absorbing the ray 8 in the optical absorber 10b if the optical fiber 11 is pulled out of the connector 10a in a direction shown by an arrow Y.

Hereby, the ray 8 is prevented from outgoing the optical transmitter-receiver and being incident upon a person's eyes and skin. If the optical fiber 11 should be pulled out of the connector 10a by any external force while the laser beam generating source 2 is operated, the ray 8 which is a laser beam can be securely prevented from leaking outside.

As the ray 8 is absorbed if the light shielding means is the optical absorber 10b, the ray 8 is never incident upon the photodiode 5 as stray light and crosstalk can be prevented from being caused in the photodiode 5. This can be realized by obliquely advancing the ray 8 along the end face 11b of the optical fiber 11 and preventing the ray 8 from being widened.

FIG. 10 shows an example in which another member 10d is provided to the optical system in the embodiment shown in FIG. 4 and an optical absorber 10b is provided to the above another member.

Figure 11:
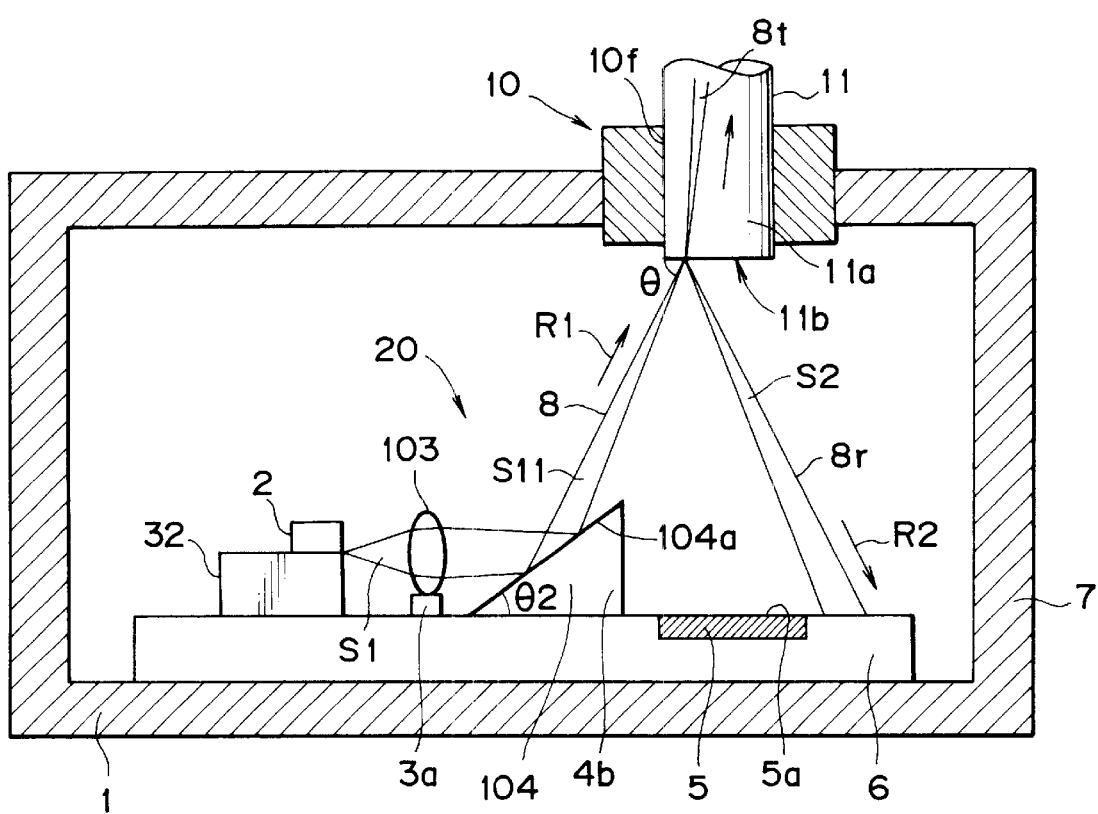
FIG. 11 shows furthermore another embodiment of the optical transmitter-receiver according to the present invention.

Next, FIG. 11 shows further another embodiment of the optical transmitter-receiver according to the present invention.

In an embodiment shown in FIG. 11, the focusing lens 3 is replaced by a focusing lens 103, compared with the embodiment shown in FIG. 4 and the reflecting mirror 4 shown in FIG. 4 is replaced by a reflecting mirror 104. After a first optical signal S1 which is a laser beam L from a laser beam generating source 2 is focused by the focusing lens 103, its optical path is bent by the total reflection film 104a of the reflecting mirror 104, the first optical signal S1 goes in a direction shown by an arrow R1 and is incident upon the end face 11b of an optical fiber 11 at an angle θ as a ray (incident light) 8. That is, although in FIG. 4, the center of the focusing lens is off from the center of the intensity of a first optical signal S1 by distance d, the center of the intensity of a first optical signal S1 and the center of the focusing lens 103 which is a convex lens are not off and equal in FIG. 11. Therefore, the effect of the optical aberration of the focusing lens 103 can be inhibited and the enhancement of optical focusing efficiency can be further desired.

The angle θ2 of the reflecting mirror 104 is set to a smaller angle than 45° and a reflected ray 8r can be irradiated obliquely on a semiconductor substrate 6. The position of the end face 11b of the optical fiber 11 can be freely selected by arbitrarily selecting the angle θ2 of the reflecting mirror 104. Naturally, the focusing lens 3 shown in FIG. 4 and the reflecting mirror 104 shown in FIG. 11 may be also used together.

FIG. 12 shows furthermore another embodiment of the optical transmitter-receiver according to the present invention.

As shown in FIG. 12, a transparent cover part 12 is arranged between a group including a laser beam generating source 2, an optical system 20 and a photodiode 5 and an optical fiber 11.

The cover part 12 prevents dust from a hole 10f from entering the laser beam generating source 2, the optical system 20, the photodiode 5 and others.

The cover part 12 may be made of glass and plastic for example and even if the cover part 12 is located between the group particularly including the optical system 20 and the photodiode 5 and the optical fiber 11, a merit that a ray 8 is obliquely incident upon the end face 11b of the optical fiber 11 at an angle θ can be utilized. That is, a reflection preventing film in accordance with the wavelength of the laser beam generating source 2 is provided to the cover part 12. However, it is technically difficult to transmit the ray 8 to the end face 11b through the cover part 12 without reflecting any ray 8 and a light ray with intensity equivalent to some percent of the intensity of the ray 8 is reflected in a direction shown by an arrow R2 by the cover part 12. However, as light rays 8r respectively reflected by two sides of the cover part 12 can be made to reach an area outside the light receiving area of the photodiode 5, they never reach the photodiode 5 as stay light.

Figure 13:
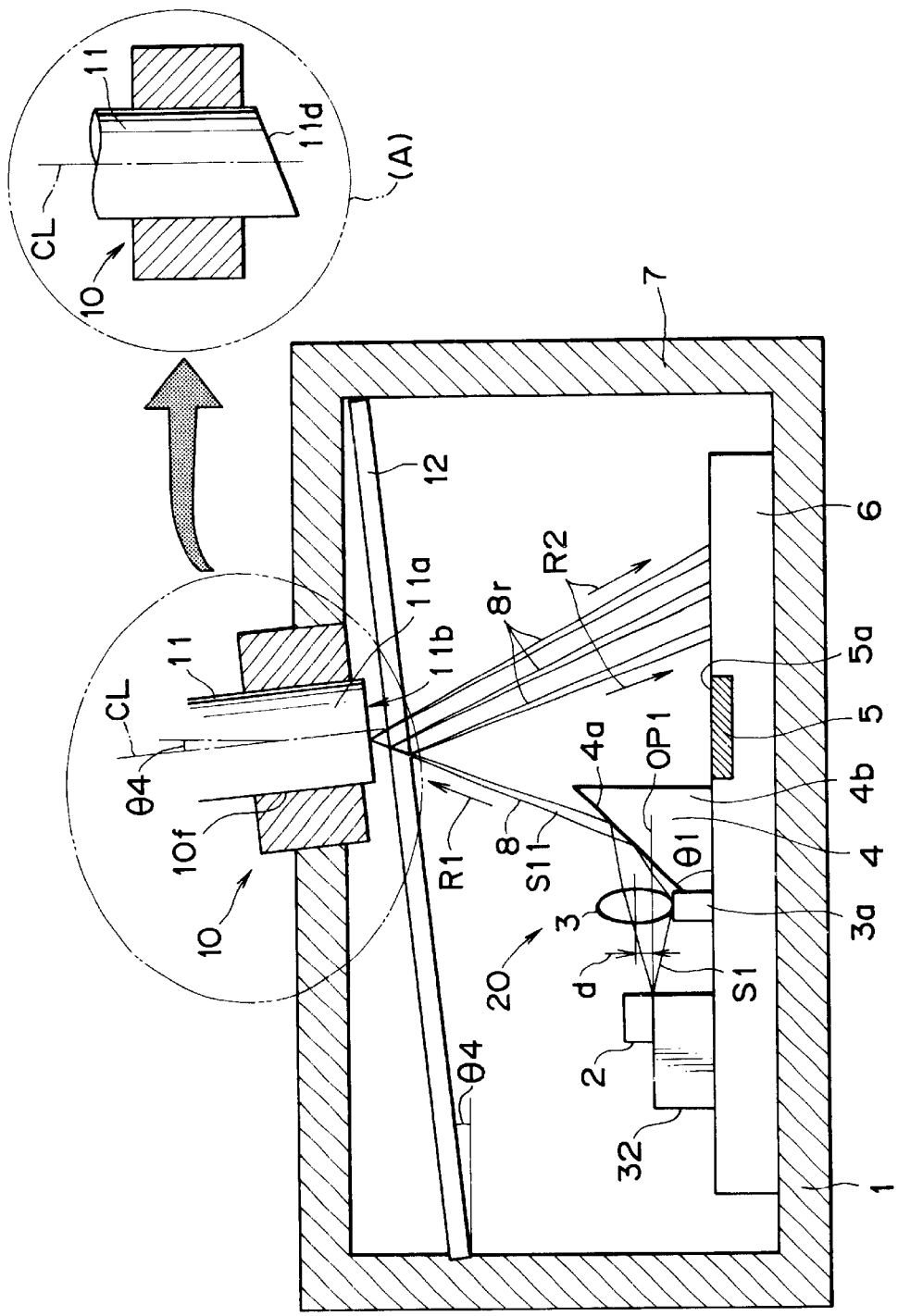
FIG. 13 shows furthermore another embodiment of the optical transmitter-receiver according to the present invention.

FIG. 13 shows furthermore another embodiment of the optical transmitter-receiver according to the present invention.

The embodiment shown in FIG. 13 is different from the embodiment shown in FIG. 12 in the following points:

A cover part 12 is arranged inside a package 7 with the cover part tilted by an angle θ4. The central axis CL of an optical fiber 11 is also arranged with it tilted by the angle θ4 based upon the package 7. A light ray 8r when a ray 8 is reflected by the cover part 12 and a light ray 8r reflected by the end face 11b can be also made to reach an area except the light receiving face of a photodiode 5 by arranging the cover part 12 and the optical fiber 11 with them tilted based upon the package 7 as described above.

Hereby, crosstalk in the photodiode 5 can be prevented. As shown in an area (A) in FIG. 13, if the end face 11d of the optical fiber 11 is tilted beforehand without tilting the central axis CL of the optical fiber 11, crosstalk can be similarly prevented from being caused by the light ray 8r in the photodiode 5.

Figure 14:
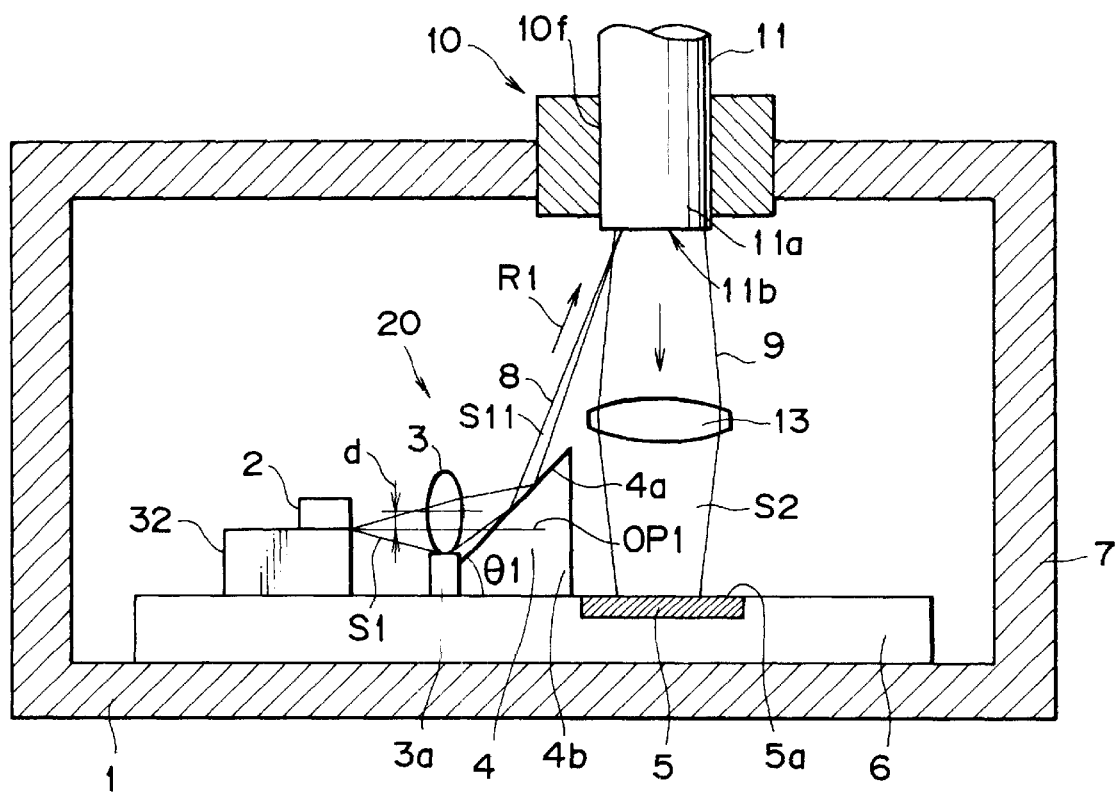
FIG. 14 shows furthermore another embodiment of the optical transmitter-receiver according to the present invention.

Next, in an embodiment shown in FIG. 14 of the optical transmitter-receiver according to the present invention, a focusing lens 13 is arranged between the end face 11b of an optical fiber 11 and a photodiode 5. Hereby, as a second optical signal S2 outgoing from the optical fiber 11 is received by the photodiode 5 after it is focused by the focusing lens 13, optical focusing efficiency between the second optical signal S2 and the photodiode 5 can be enhanced.

In an embodiment shown in FIG. 15 of the optical transmitter-receiver according to the present invention, a reflecting mirror 4 and a focusing lens 3 respectively in an optical system 20 are integrated. A function with which the optical path of a first optical signal S1 is bent in an optical system 20 to be a ray 8 is the same as that in the optical system 20 shown in FIG. 4. The number of parts can be reduced by integrating the focusing lens 3 and the reflecting mirror 4 as described above, in addition, the optical system 20 can be attached onto a semiconductor substrate 6 by one bonding work and optical alignment between the focusing lens and the reflecting mirror is not required.

Figure 16:
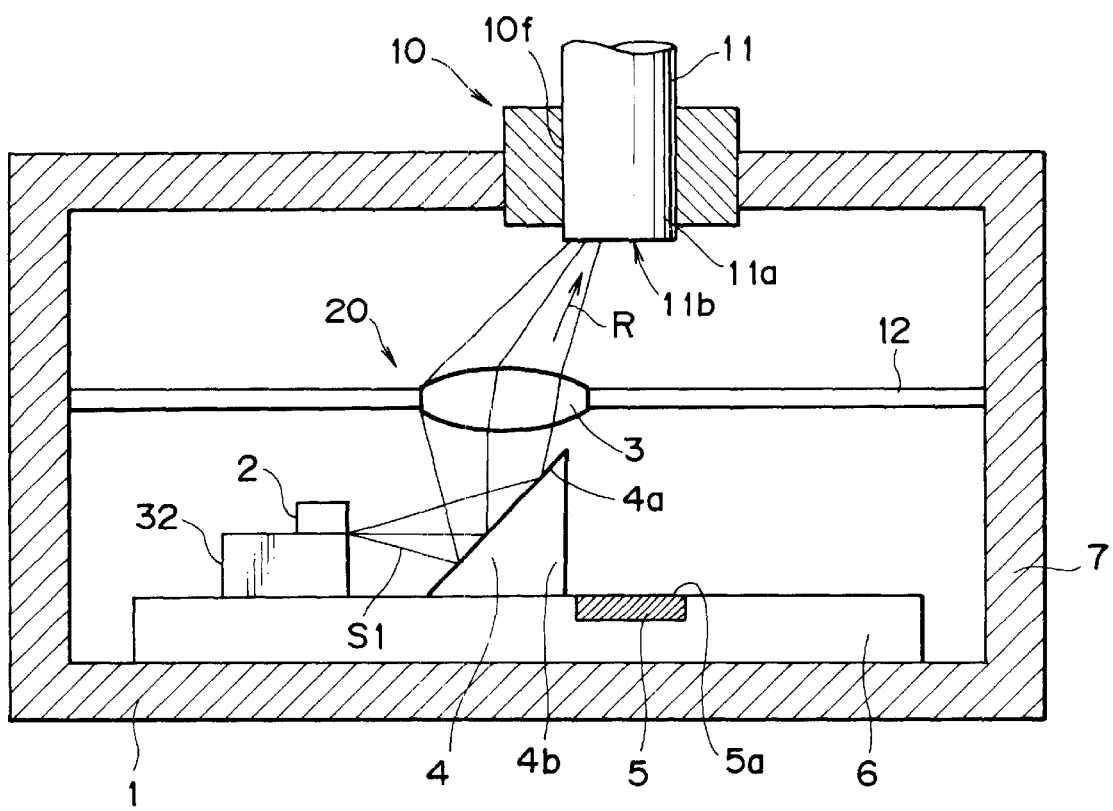
FIG. 16 shows furthermore another embodiment of the optical transmitter-receiver according to the present invention.

In an embodiment shown in FIG. 16 of the optical transmitter-receiver according to the present invention, a focusing lens 3 is attached to a transparent cover part 12. That is, an optical system 20 is composed of the focusing lens 3 and a reflecting mirror 4 and the focusing lens 3 is integrated with the cover part 12 between the reflecting mirror 4 and the end face 11b of an optical fiber 11. After a first optical signal S1 from a laser beam generating source 2 is reflected by the total reflection film 4a of the reflecting mirror 4, the first optical signal is focused by the focusing lens 3 and is obliquely incident upon the end face 11b of the optical fiber 11 at a predetermined angle as incident light.

Figure 17:
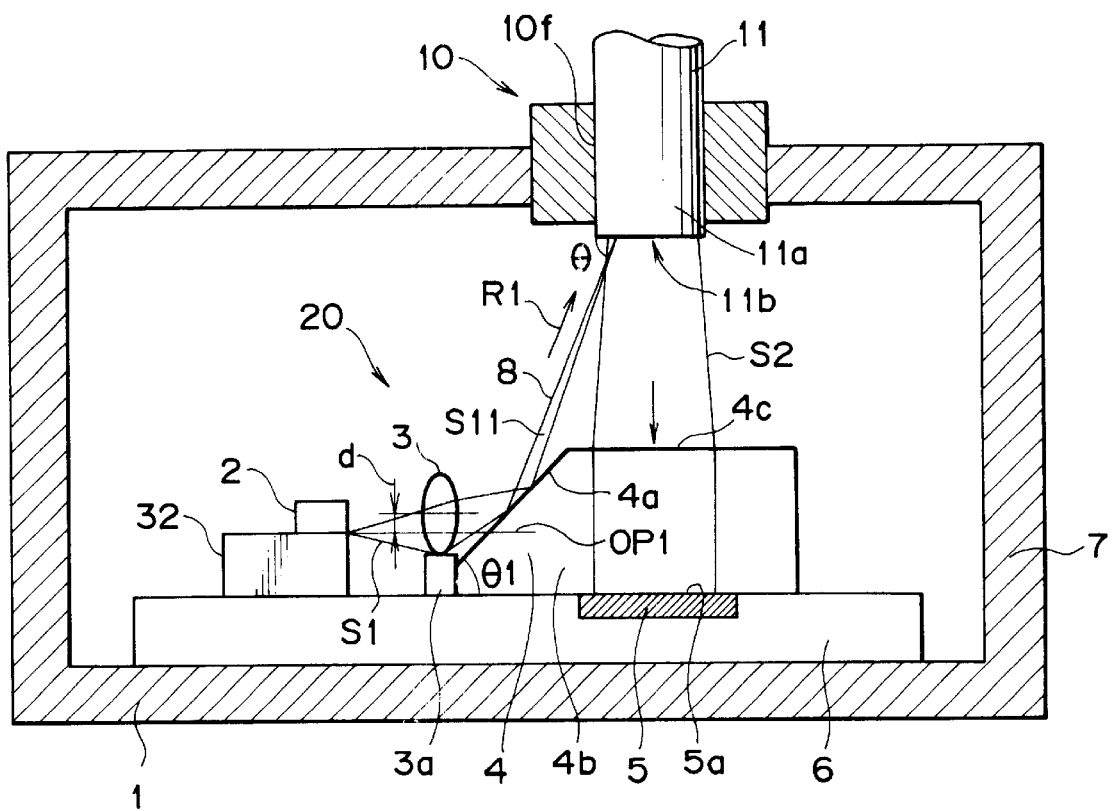
FIG. 17 shows furthermore another embodiment of the optical transmitter-receiver according to the present invention.

In an embodiment shown in FIG. 17 of the optical transmitter-receiver according to the present invention, an optical system 20 is provided with a function for leading not only a first optical signal S1 but a second optical signal S2. The center of the intensity of a first optical signal S1 is bent by a focusing lens 3 provided with the similar function to the focusing lens 3 shown in FIG. 4 and the total reflection film 4a of a reflecting mirror 4 provided with the similar function to the reflecting mirror 4 shown in FIG. 4 to be a ray 8 and the ray 8 is incident upon the end face 11b of an optical fiber 11 at an angle θ in a direction shown by an arrow R1. In the meantime, a second optical signal S2 transmitted through the optical fiber 11 passes a prism 4c in the optical system 20 and is received by the light receiving face of a photodiode 5.

Figure 18:
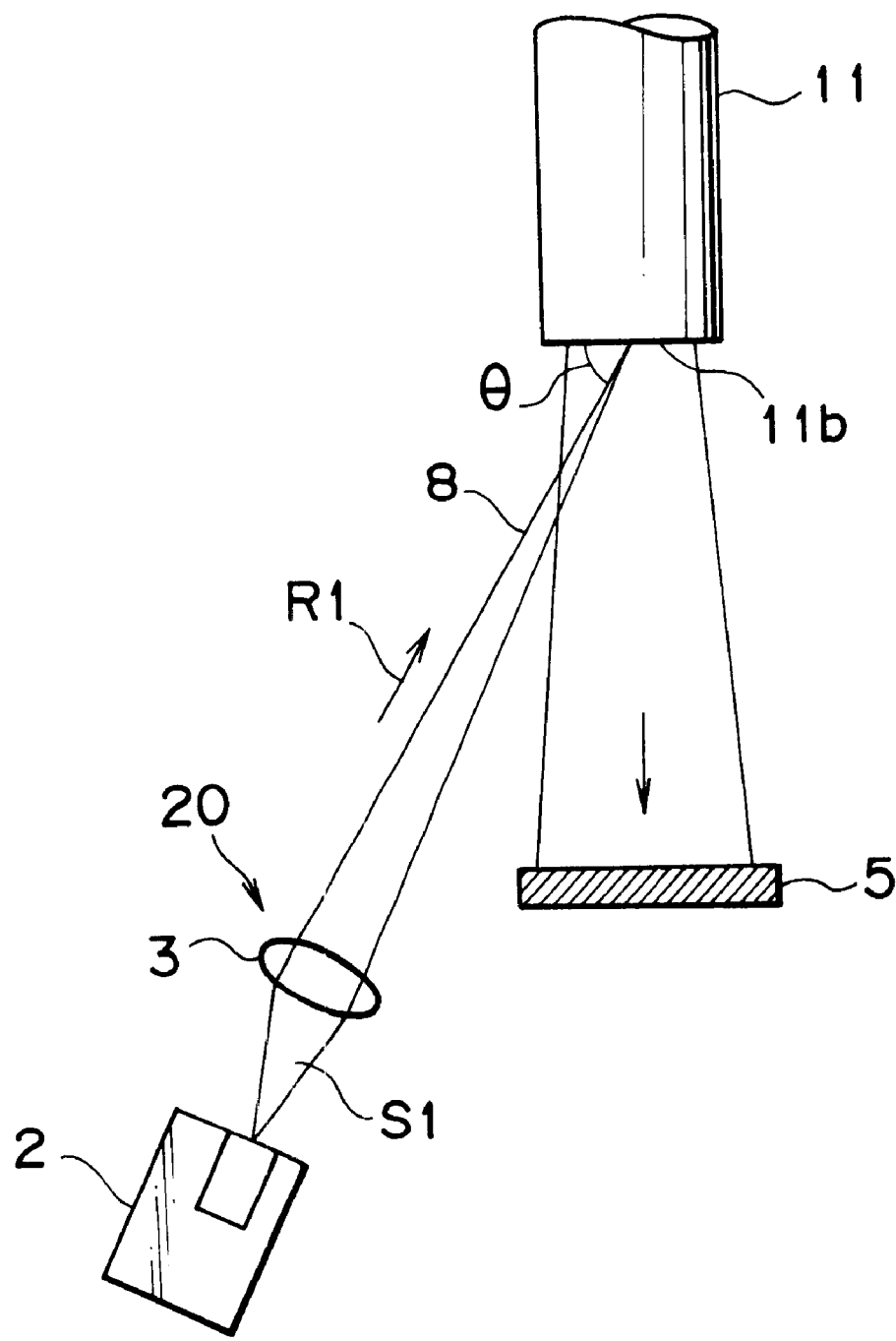
FIG. 18 shows the other embodiment of the optical transmitter-receiver according to the present invention.

FIG. 18 shows the other embodiment of the present invention and a first optical signal S1 from a laser beam generating source 2 is directly and obliquely incident upon the end face 11b of an optical fiber 11 at an angle θ through a focusing lens 3 (a convex lens) of an optical system 20. That is, the above reflecting mirror 4 and others are not required.

As described above, in the embodiments of the present invention, not only optical focusing efficiency from the optical fiber to the photodiode can be enhanced but crosstalk caused because the reflected light of a first optical signal is incident upon the photodiode together with a second optical signal can be prevented. That is, focusing efficiency when a second optical signal is received by the photodiode can be enhanced and crosstalk (stray light) can be reduced or removed.

As a large-sized beam splitter used in a conventional type is not required to be used, the cost can be reduced.

In the embodiments of the present invention, in the case of single-core two-way optical communication using the optical fiber, the following effect is produced by approximately completely splitting an optical path in which a beam from a light source is incident upon the optical fiber and an optical path in which a beam from the optical fiber is incident upon the light receiving means:

(1) Crosstalk between a first optical signal S1 for sending and a second optical signal S2 for receiving can be reduced.

(2) Optical focusing efficiency between the optical fiber and the light receiving means can be enhanced.

The present invention is not limited to the above embodiments.

In the above embodiments, the optical transmitter-receiver according to the present invention is used for networking the control system for home or the multimedia system. However, the optical transmitter-receiver according to the present invention is not limited to the above networking and can be also applied to a communication system for communicating various information in a mobile body such as an automobile, an airplane and a ship and others.

The wavelength of a beam generated by the laser beam generating source as emission means is not limited to 650 nm and needless to say, another wavelength may be also used. The emission means is not limited to the laser beam generating source and another type of beam generating source may be also used.

It is needless to say that if the optical fiber is attached to the package, holding means for positioning the optical fiber in accordance with the package and enabling fixing the optical fiber in its axial direction is provided.

What is claimed is:

1. An optical transmitter-receiver connected to an optical fiber used for a single-core two-way optical communication channel for making a first optical signal to be sent incident upon an end of the optical fiber and receiving a second optical signal sent via the optical fiber, comprising:

emission means for emitting said first optical signal;

light receiving means for receiving said second optical signal outgoing from the end of said optical fiber; and an optical system for making the first optical signal from said emission means incident upon the incident end of said optical fiber in an optical path in a direction different from a direction of an optical path in which said second optical signal is outgoing from the end of the optical fiber, wherein:

if said first optical signal is made incident upon the end of the optical fiber, said light receiving means is arranged outside an area which reflected light generated because said first optical signal is reflected by the end of said optical fiber reaches, the optical path of the first optical signal and the optical path of the second optical signal are independent.

2. An optical transmitter-receiver according to claim 1, wherein:

said optical system is provided with:
a focusing member for focusing a first optical signal from said emission means; and a direction converting element for converting the optical path of the focused first optical signal to a direction different from a direction in which said second optical signal is outgoing from the end of said optical fiber and making the focused first optical signal incident upon the end of the optical fiber.

3. An optical transmitter-receiver according to claim 2, wherein:

the direction converting element of said optical system is provided with a reflecting film for converting the optical path of said first optical signal to a direction different from a direction in which said second optical signal is outgoing from the end of said optical fiber on its reflecting surface.

4. An optical transmitter-receiver according to claim 3, wherein:

said reflecting film is a total reflection film.

5. An optical transmitter-receiver according to claim 1, wherein:

a package for housing said emission means, said optical system and said light receiving means is provided; and the end of the optical fiber is attached to the package opposite to said light receiving means so that the optical fiber can be detached.

6. An optical transmitter-receiver according to claim 5, wherein:

light shielding means for preventing a beam from said emission means from leaking from the package if said optical fiber is off from said package is arranged in the package.

7. An optical transmitter-receiver according to claim 1, wherein:

a focusing element for focusing said second optical signal and making it incident upon said light receiving means is provided.

8. An optically sending and receiving method for connecting an optical transmitter-receiver to an optical fiber used for a single-core two-way optical communication channel, making a first optical signal to be sent incident upon an end of the optical fiber and receiving a second optical signal sent via the optical fibers wherein:

a first optical signal from an emission means is incident upon the end of said optical fiber in an optical path in a direction different from a direction of an optical path in which said second optical signal is outgoing from the end of said optical fiber, the optical path of the first optical signal and the optical path of the second optical signal being independent;

light receiving means receives a second optical signal outgoing from the end of said optical fiber; and said light receiving means is constituted so that it never receives the reflected light of said first optical signal reflected by the end of said optical fiber.

* * * * *